United States Patent
Wu

(10) Patent No.: US 9,808,109 B2
(45) Date of Patent: Nov. 7, 2017

(54) PROGRAMMABLE HEATING CIRCULATOR

(71) Applicant: Jeff Wu, Stafford, TX (US)

(72) Inventor: Jeff Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 209 days.

(21) Appl. No.: 14/678,403

(22) Filed: Apr. 3, 2015

(65) Prior Publication Data

US 2015/0282661 A1 Oct. 8, 2015

Related U.S. Application Data

(60) Provisional application No. 61/975,553, filed on Apr. 4, 2014.

(51) Int. Cl.

| | |
|---|---|
| *A47J 27/62* | (2006.01) |
| *A47J 36/00* | (2006.01) |
| *A47J 36/24* | (2006.01) |
| *A47J 36/32* | (2006.01) |
| *H05B 3/80* | (2006.01) |
| *A47J 27/10* | (2006.01) |
| *A47J 27/18* | (2006.01) |

(52) U.S. Cl.
CPC ............... *A47J 27/62* (2013.01); *A47J 36/00* (2013.01); *A47J 36/2405* (2013.01); *A47J 36/32* (2013.01); *H05B 3/80* (2013.01); *A47J 27/10* (2013.01); *A47J 27/18* (2013.01)

(58) Field of Classification Search
CPC combination set(s) only.
See application file for complete search history.

(56) References Cited

U.S. PATENT DOCUMENTS

| | | | |
|---|---|---|---|
| 8,426,777 B2* | 4/2013 | Elston, III | .............. F24C 7/087 |
| | | | 219/391 |
| 8,688,277 B2* | 4/2014 | Studor | .................... A47J 31/44 |
| | | | 422/62 |

(Continued)

FOREIGN PATENT DOCUMENTS

| | | |
|---|---|---|
| DE | 102010060650 A1 | 5/2011 |
| EP | 2540199 A1 | 2/2011 |

(Continued)

OTHER PUBLICATIONS

Extended European Search Report for European Application No. 15162683.5; dated Aug. 11, 2015.

(Continued)

*Primary Examiner* — Anne M Antonucci
*Assistant Examiner* — Renee M Larose
(74) *Attorney, Agent, or Firm* — RatnerPrestia

(57) ABSTRACT

A sous-vide circulator cooker temperature control device that includes a motor module which can be replaced by users when the motor fails. The circulator cooker temperature control device includes an outer portion, an upper portion, a middle portion, and a lower portion. The upper portion includes a programmable controller storing one or more codes that represent cooking temperatures and times selectable by a user. The controller can be programmed to receive additional codes. The controller includes a speaker and a voice assist algorithm configured to alert users of events.

11 Claims, 3 Drawing Sheets

(56) References Cited

U.S. PATENT DOCUMENTS

| | | | | |
|---|---|---|---|---|
| 2011/0132201 A1* | 6/2011 | Richardson | ............... | F24C 7/08 99/325 |
| 2011/0186283 A1* | 8/2011 | Preston | ..................... | B01L 7/02 165/287 |
| 2012/0321760 A1* | 12/2012 | Xie | ......................... | A47J 36/32 426/231 |
| 2013/0003490 A1* | 1/2013 | Kemker | ................. | A47J 27/62 366/142 |
| 2013/0220143 A1* | 8/2013 | Fetterman | ........... | A47J 36/2405 99/330 |
| 2014/0170275 A1* | 6/2014 | Bordin | ................... | G09B 19/24 426/233 |
| 2015/0019354 A1* | 1/2015 | Chan | ..................... | G06Q 50/12 705/15 |

FOREIGN PATENT DOCUMENTS

| | | |
|---|---|---|
| EP | 2354738 A2 | 8/2011 |
| EP | 2767159 A1 | 8/2014 |
| EP | 2926700 A1 | 10/2015 |
| KR | 20100124243 A | 11/2010 |

OTHER PUBLICATIONS

English Abstract of DE102010060650; Published May 26, 2011;Retrieved from www.espacenet.com on Nov. 4, 2015.
"Anova Sous Vide"; Jan. 1, 2014; XP055116970; Retrieved from the Internet: URL:http://www.studiokitchen.com/studio-kitchen/anova-immersion-circulator[retrieved on Aug. 5, 2014].
English Abstract of KR20100124243; Published Nov. 26, 2010; Retrieved from www.espacenet.com on Nov. 4, 2015.

* cited by examiner

PROGRAMMABLE HEATING CIRCULATOR

CROSS-REFERENCE TO RELATED APPLICATION

This application claims priority to U.S. Provisional Application No. 61/975,553, filed Apr. 4, 2014, the contents of which are entirely incorporated by reference herein.

FIELD OF TECHNOLOGY

The present disclosure relates generally to food cooking devices, and more specifically, to a precision temperature controlled water pump circulator appliance for cooking food in water.

BACKGROUND

Sous-vide is a method of cooking food sealed in airtight plastic bags in a water bath for longer than normal cooking times at an accurately regulated temperature much lower than normally used for cooking, typically around 55° C. (131° F.) to 60° C. (140° F.) for meats and higher for vegetables. Current sous-vide circulators are built with a motor that is secured within the circulator's housing. While this allows for lower cost fabrication, in the event of a pump failure, the entire circulator will cease to function, creating the need for costly repair work or replacement of the unit. Additionally, sous-vide cooking can be challenging for the novice user. Selection of correct cooking times and temperature can be difficult.

Thus, there is need for improvement in the field.

BRIEF DESCRIPTION OF THE DRAWINGS

In order to describe a manner in which features of the disclosure can be obtained, reference is made to specific embodiments that are illustrated in the appended drawings. The components in the drawings are not necessarily drawn to scale, the emphasis instead being placed upon clearly illustrating the principles of the disclosure. Based on an understanding that these drawings depict only example embodiments of the disclosure and are not intended to be limiting of scope, the principles herein are described and explained with additional specificity and detail through the use of the accompanying drawings. Moreover, in the drawings, like reference numerals designate corresponding parts throughout the several views.

DETAILED DESCRIPTION

Figure 1:
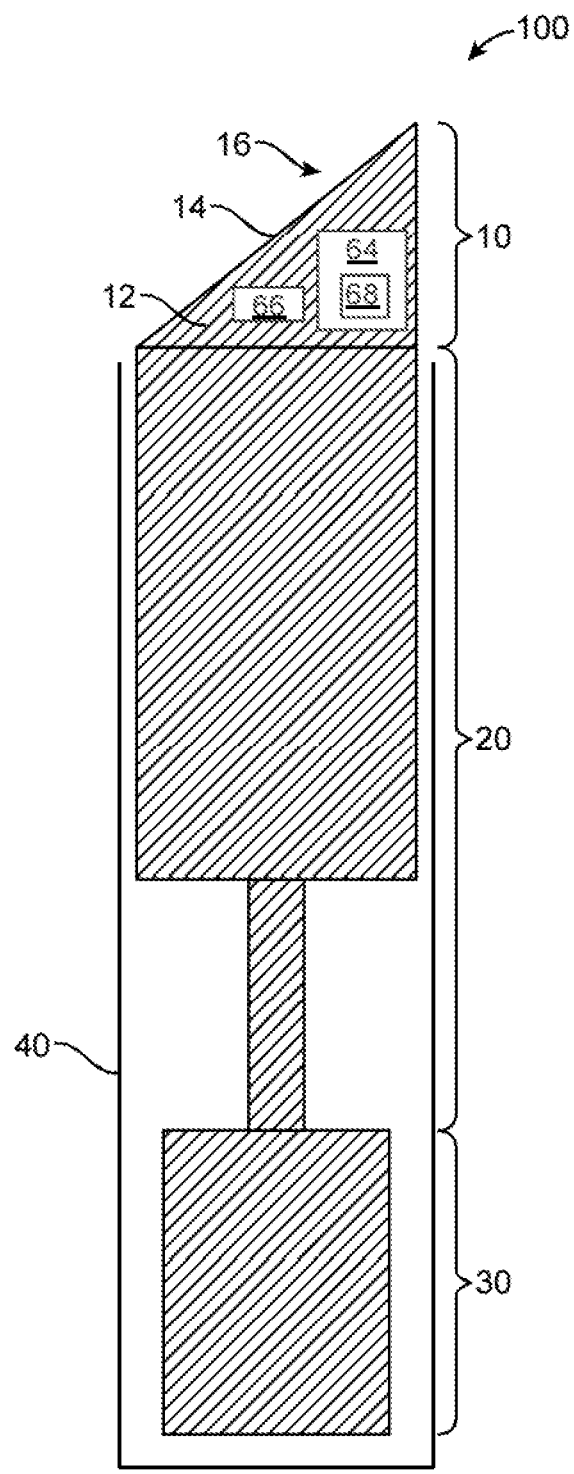
FIG. 1 is a side view of an embodiment of a heat circulator cooker.

The disclosure is illustrated by way of example and not by way of limitation, in the figures of the accompanying drawings in which like references indicate similar elements. It should be noted that references to "an" or "one" embodiment in this disclosure are not necessarily to the same embodiment, and such references mean "at least one". A person skilled in the relevant art will recognize that other components and configurations may be used without departing from the scope of the disclosure.

Several definitions that apply throughout this document will now be presented. "Circulating" means agitating, blending or mixing of one or more fluids. Hence a "circulator" is a device which can be configured to agitate, blend or mix a fluid. Fluids will be understood to comprise liquids. "Coupled" is defined as connected, whether directly or indirectly through intervening components and is not necessarily limited to physical connections. Coupled devices can be devices which are in signal communication with one another. Coupled devices can be coupled. "Connected" means directly connected or indirectly connected.

Broadly speaking, this disclosure relates to cooking apparatus for food preparation. More specifically, this disclosure relates to sous-vide circulator cookers. This application refers to a sous-vide circulator cooker, sous-vide cooker, circulator cooker, and circulator interchangeably.

A circulator cook temperature control device having an upper portion, a middle portion, and a lower portion, the middle portion can be coupled to both the upper portion and the lower portion. The upper portion can include a controller, display device, and an input device. The upper portion is configured to protect the controller, display device, and input device from steam during use. The middle portion can include a motor module mount, which couples to the controller, and a coupler, that can be coupled to the lower portion. The middle portion can further include a pump connector 46, a thermometer 26, and a plurality of fluid level sensors 27. The lower portion can include a removable modular motorized fluid agitation device, a heating element coupled to the controller, and the lower portion can be configured for at least partial immersion in at least one fluid. The fluid agitation device can be an impeller or a rotatable blade. The fluid agitation device can be housed within a pump mechanism. The pump mechanism can include a pump base, and an impeller. The pump base can be designed to surround the impeller. In at least one embodiment the entire pump mechanism is removable.

In at least one embodiment, a circulator cooker includes a modular motorized pump mechanism that can be removed from the circulator and replaced. Specifically, the modular motorized pump mechanism can include a motor, housing with external connectors, a fluid agitation device, and a removable cover coupled to the housing. The motorized pump module can be coupled via threadable engagement (for example, a light bulb-type screw assembly), pin plug connectors, pressure based electrical contacts (for example, a battery connection assembly) or any other suitable electrical connection mechanism. The removable pump module can be placed under the main body of the circulator, pass through the main housing of the circulator or be adjacent to the main body of the circulator. The modular pump mechanism can include its own housing that is sealed from fluid to protect the motor. The modular pump housing device can be fabricated from stainless steel, molded from plastic, or derived from any other suitable material.

In at least one embodiment, a sous-vide circulator has a user removable modular motorized pump system coupled to the middle portion using a fixing member. The fixing member 43 can be a plurality of screws, light bulb style screw caps, a plurality of clips, or any other suitable coupling means.

In at least one embodiment, a sous-vide circulator has the ability to calculate an estimated heat up time using the mass of the food in question, the volume of the food in question, the heat capacity of the fluid, the volume of the fluid, and the input power.

In at least one embodiment, a sous-vide circulator cooker can also have a voice assist function, comprising a wireless radio 66 and speaker 60. The voice assist function can be coupled to the controller and configured to give voice notifications, for example, the voice notifications can relate to estimated heat up time, notification of errors, and notifications that cooking is complete, among other commands. The voice assist function comprises a voice assist algorithm, the voice assist algorithm can be a Hidden Markov Model type, a dynamic time warping-based speech recognition model type, a neural network, a Deep Neural Network, or any other suitable algorithm, model or method. The controller is configured to store index codes which can refer to specific cooking recipes, times, and temperatures. The index codes can be selected by the user and automatically executed by the circulator. In at least one embodiment, the circulator cooker can give voice notifications in multiple languages.

In at least one embodiment, a heat circulator cooker can include a Wi-Fi or Bluetooth radio for recipe specification uploads from a phone, tablet, or PC and direct remote control and monitoring. Thus, in at least one embodiment of this disclosure a fluidic temperature controller can include a non-volatile memory that stores a plurality of recipe specifications and user generated data files as well as a control interface that can enable a user of the heat circulator cooker to select and recall recipe specifications. The stored index codes can be updated wirelessly, for example, via radio TCPIP, wireless fidelity (WiFi) or BLUETOOTH. In at least one embodiment of this disclosure, a heat circulator cooker can search for recipes that match certain specification criteria, including but not limited to, food choice, food preparation, cook temperature, and cook time.

In at least one embodiment, a heat circulator cooker stores in non-volatile memory 64 a library of codes 68 that correspond to the cooking temperature and times of different foods, for example, fish, beef, or eggs. These codes can be input into the circulator and the circulator will automatically run at the corresponding temperature and for the corresponding time. Codes can range from alpha numeric codes to "QR" codes to UPC barcodes found on retail packaging. Codes can refer to temperatures and times that correspond to different cuts and types of meat, as well as other foods.

In at least one embodiment, the circulator has two or more fluid level sensors or an ultrasonic level detector which allow for the circulator to monitor the fluid level within a predetermined range. In at least one embodiment the sensors can be coupled to an external fluid source and are configured to automatically add fluid if the level drops below a certain threshold or if fluid discharge is in excess of a certain threshold.

In at least one embodiment, the upper portion of the fluidic temperature control is configured to protect the controller, display device, and input device from steam during use.

FIG. 1 illustrates a side view of a first embodiment of a heat circulator cooker 100. As discussed above the circulator cooker 100 includes an outer portion 40, an upper portion 10, a middle portion 20, and a lower portion 30. The outer portion 40 can be a protective shell capable of encompassing and coupling to the circulator cooker 100. The outer portion 40 can be coupled to the circulator cooker via an integrated clamp 42 (shown in FIG. 2), which can allow the outer shell to be removed without the use of tools. The integrated clamp 42 can also secure the outer shell in place thus encompassing the internal components during use. The protective shell can also enclose and support various internal electronic components (including motors, fans, and electronic devices). The protective shell shape can also vary in appearance depending on design of the heat circulator cooker. The upper portion 10 can include a controller 12, a display device 14, and an input device 16 coupled to the controller 12. The controller 12 can control the fluid temperature, fluid level, and general operation of the circulator cooker. The display device 14 can display information such as the temperature of the fluid in which the lower portion 30 is at least partially immersed or the speed at which an impeller housed within the lower portion 30 is spinning. The input device 16 can include one or more buttons or controls which can enable a user to select a temperature for the fluid in which the lower portion 30 is at least partially immersed.

Figure 2:
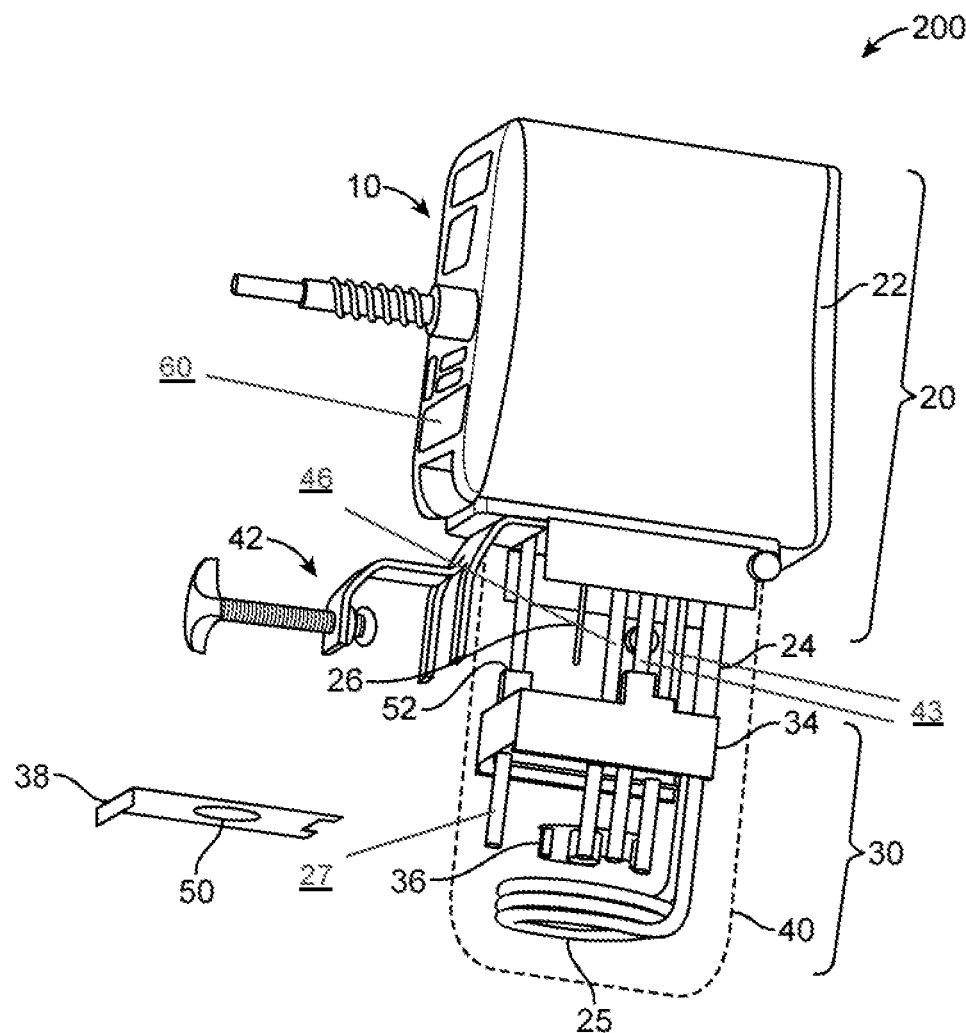
FIG. 2 is an isometric view of a heat circulator cooker with an outside shell and showing an exploded view of the pump base.
Figure 3:
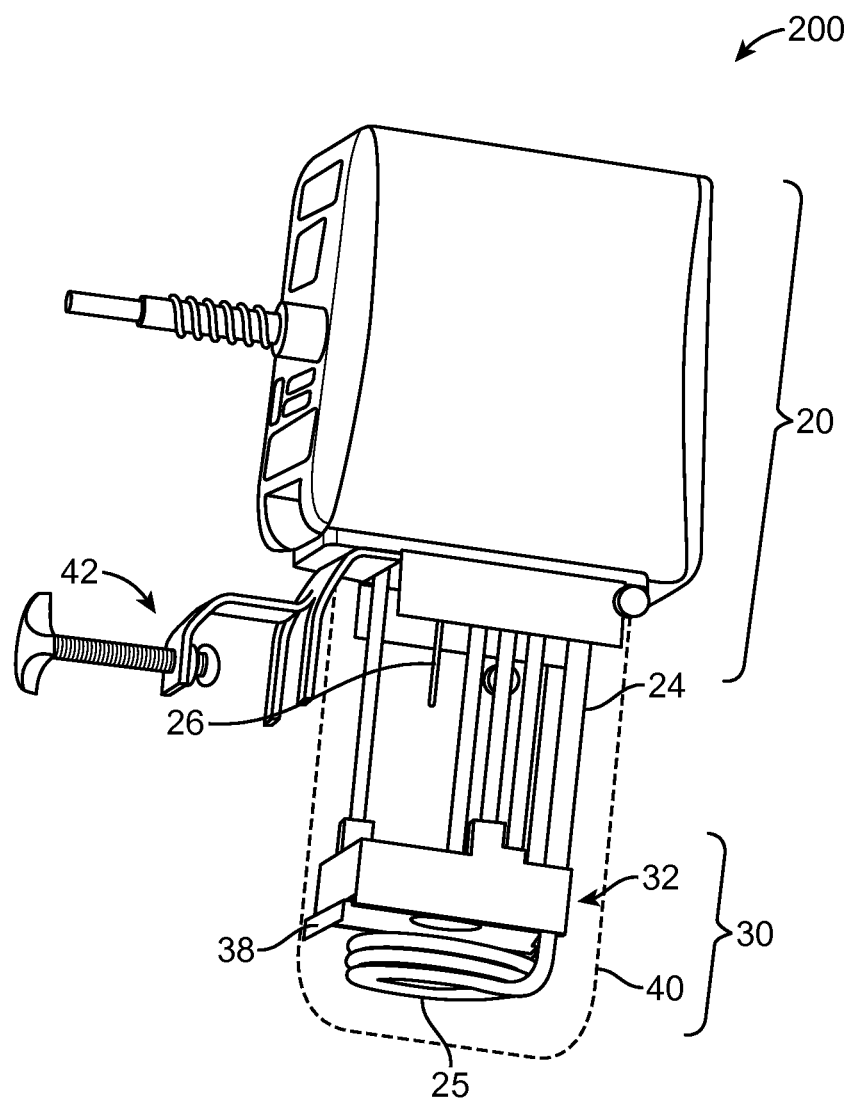
FIG. 3 is an isometric view of a heat circulator cooker with an outside shell and showing the pump base.

FIGS. 2 and 3 illustrate isometric views of the middle and lower portions 20 and 30, respectively, of a second embodiment of a heat circulator cooker 200. The middle portion 20 can include a removable motor 22 coupled to the controller 12 and heater 24. The removable motor 22 can be releasably coupled to the controller 12 and heater 24. The removable motor 22 can be coupled via a threaded portion, clamps, pressured contacts, or any other suitable coupling mechanism capable of also providing electrical connectivity. The removable motor 22 can be configured to circulate fluid through the cooker. The heater 24 can be configured for at least partial immersion in a fluid. The heater 24 can include heating coils 25 or any other suitable fluid heating mechanism. The middle portion 20 can further include a thermometer 26 configured to monitor the fluid temperature within the circulator cooker 200. The thermometer 26 can be communicatively coupled to the controller 12, thus allowing the controller 12 to precisely adjust the fluid temperature. The middle portion can also include a plurality of fluid level sensors communicatively coupled to the controller 12 allowing the controller 12 to adjust the fluid level. The lower portion 30 can include a pump mechanism 32 wherein the pump mechanism 32 can include a housing 34 with an opening 52 and a removable cover 38. The removable cover 38 can be coupled to the housing 34 with a sliding pane, a hinged door, a screw cap, or another suitable mechanism capable of being removed without tools. The housing 34 encompasses the impeller mechanism 36, and when the removable cover 38 is properly attached, the housing 34 and removable cover 38 encase the impeller mechanism 36. FIG. 3 illustrates the pump mechanism 32 with the removable cover 38 removably attached, thus completely encasing the impeller mechanism 36.

FIG. 2 illustrates the removable cover 38 removably detached from the housing 34, thus exposing the impeller mechanism 36. The housing 34 and removable cover 38 can include a plurality of openings 50 for the intake and expulsion of the fluid as the impeller agitates the fluid. These openings 50 can be located on any surface of the housing 34 or removable cover 38 depending on the design of the impeller mechanism 36.

It will be apparent that various changes may be made to the embodiments described herein without departing from the scope of this disclosure. The embodiments described in this disclosure are illustrative, and are not to be construed as limiting the scope of the following claims.

What is claimed is:

1. A circulator cooker temperature control device comprising:
   an upper portion and a middle portion comprising a controller coupled to a memory, an input device, a removable modular motorized pump system and a speaker, the input device configured to receive one or more inputs, the memory configured to store one or more index codes associated with a temperature and a heating duration for one or more food preparations, the controller configured to execute an index code of the one or more index codes in response to the received input, and the speaker configured to emit audio notifications; and a lower portion removably coupled to the middle portion, the lower portion having a heater configured for at least partial immersion in a fluid and the heater runs at a temperature and a heating duration according to the executed index code and a removable modular motorized pump mechanism removably coupled to the removable modular motorized pump system, the pump mechanism further comprising a pump base, a housing, and an impeller mechanism.

2. The circulator cooker temperature control device of claim 1, wherein the upper portion further comprises a display device and a wireless radio coupled to the controller.

3. The circulator cooker temperature control device of claim 1, wherein the middle portion further comprises a pump connector, a thermometer, and a plurality of fluid level sensors, the pump connector connecting the removable modular motorized pump system and the pump mechanism.

4. The circulator cooker temperature control device of claim 1, wherein the removable modular motorized pump system can be coupled to the middle portion via a plurality of screws, light bulb style screw caps, clips, or other suitable means.

5. The circulator cooker temperature control device of claim 1, wherein the one or more index codes correspond to a plurality of different food cook times, temperatures, and recipes which can be selected by a user and automatically executed by the controller.

6. The circulator cooker temperature control device of claim 5, further comprising a program that, based on the plurality of different food cook times, temperatures, and recipes, calculates time to heat up, and notifies users of cooking events via the speaker coupled to the controller that gives voice notifications and operational directions in multiple languages.

7. The circulator cooker temperature control device of claim 5, wherein the one or more index codes are updated via wireless radio TCPIP, WiFi, or Bluetooth.

8. The circulator cooker temperature control device of claim 1, wherein a plurality of fluid depth sensors enables fluid immersion depth calculation and can be coupled to an external fluid source to automatically add extra fluid when the fluid level is too low.

9. The circulator cooker temperature control device of claim 1, wherein the removable modular motorized pump system is configured to allow intake and expulsion of fluid.

10. The circulator cooker temperature control device of claim 1, wherein the removable modular motorized pump system is configured to be located adjacent to the upper portion.

11. The circulator cooker temperature control device of claim 1, wherein the impeller mechanism includes a removable cover.

* * * * *